United States Patent [19]

Lee

[11] 4,451,055

[45] May 29, 1984

[54] PROPULSION MEANS ACTUATED BY WEIGHT

[76] Inventor: Robert E. Lee, 479 Dean St., Brooklyn, N.Y. 11217

[21] Appl. No.: 895,511

[22] Filed: Apr. 11, 1978

[51] Int. Cl.³ .................... B62M 1/00; A63C 17/12
[52] U.S. Cl. ............................. 280/221; 280/11.115
[58] Field of Search ............... 280/11.11, 221, 226 A, 280/3, 11.115, 220, 226 R, 1.11 R, 11.19, 11.21

[56] References Cited

U.S. PATENT DOCUMENTS

| 581,453 | 4/1897 | Boldt | 280/11.11 R |
| 999,660 | 8/1911 | Koppel | 280/11.11 R |
| 2,449,871 | 9/1948 | Bohler | 280/11.11 R |

FOREIGN PATENT DOCUMENTS 1007741  5/1952  France .................... 280/11.11 R

*Primary Examiner*—Joseph F. Peters, Jr.

[57] ABSTRACT

Weight carriers, and a method of propulsion by applying weight force on the weight carrier, wherein the weight load forces extending arms to apply a force to the axles having clutched pinions which engage the racks forcing the wheels secured to the axles to rotate in one direction. When the weight is unloaded or lifted, the upper frame carrying the weight is then extended back to the elevated position permitting the oscillation cycle to continue as the weight force is applied and relative to the purpose desired. When used as a roller skate with one of the same secured to each foot, the oscillation cycle, if so desired, may continue or stop functioning at the will of the user.

2 Claims, 10 Drawing Figures

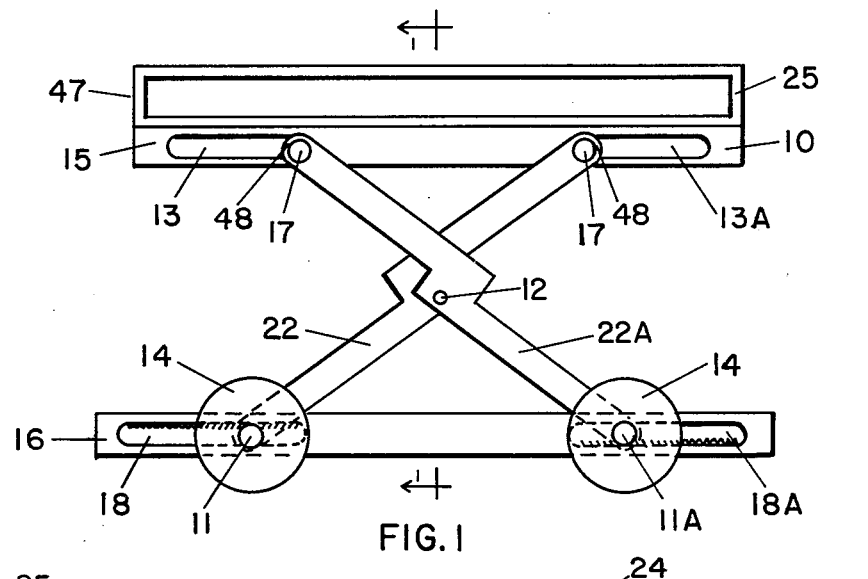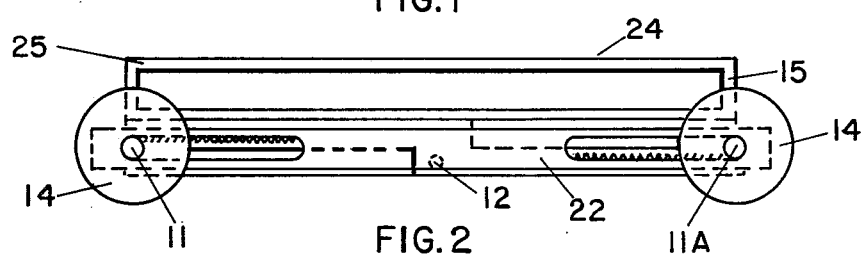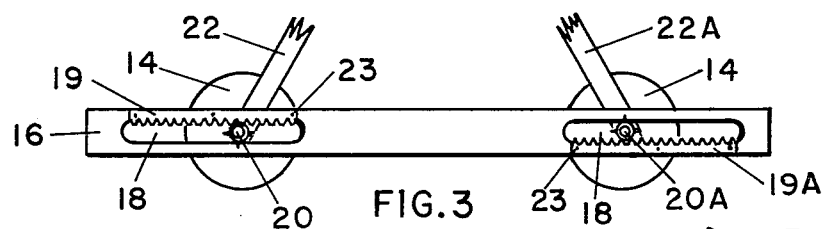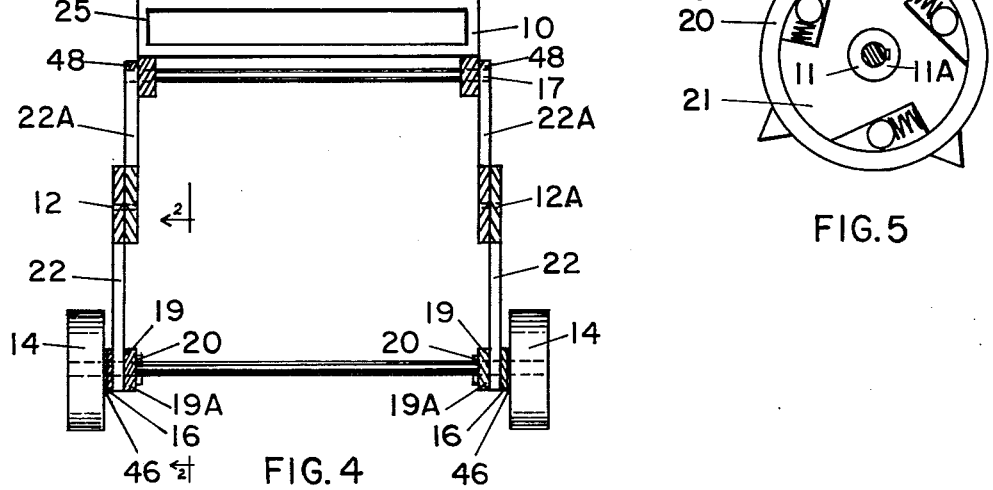

PROPULSION MEANS ACTUATED BY WEIGHT

This invention relates to weight carriers. The weight carriers are actuated by the shifting of weight. Weight is loaded on the embodiments in which the weight forces the wheels to turn. An object of this invention is to provide a means of transportation which is inexpensive to manufacture and uses no fuel.

A further object of this invention is to provide a propulsion means that will be practical for recreational usage.

It is a further object of this invention to provide a weight carrier adaptable to many uses.

Still additional objects, benefits and advantages of this invention will become evident from a study of the following detailed description taken in conjunction with the accompanying drawings, in which:

FIG. 1 is a side elevation view of a general weight carrier.

FIG. 2 is a side view of the weight carrier in FIG. 1, in the collapsed position.

FIG. 3 is a sectional view of the carrier taken on line 2—2 in FIG. 4, and showing the racks and pinions which turn the wheels.

FIG. 4 is a cross sectional view of the carrier in FIG. 1, taken on line 1—1.

FIG. 5 is a fragmentary view of the ratchet type pinion which traverses the rack.

Figure 6:
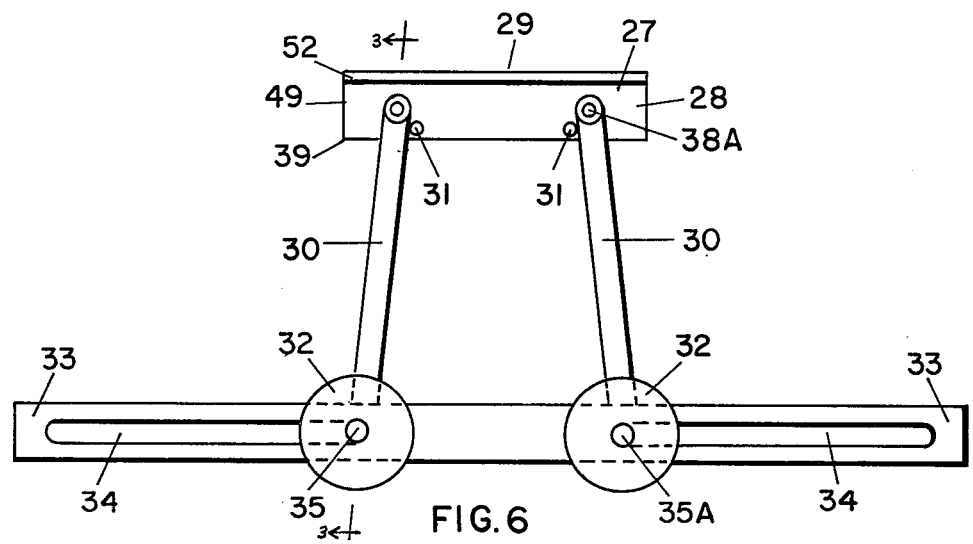
FIG. 6 is a side elevation view of a general weight carrier.
Figure 7:
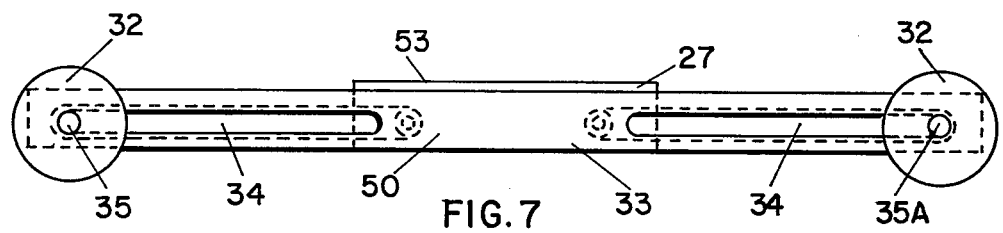
FIG. 7 is a side view of the carrier in FIG. 6 in the collapsed position.
Figure 8:
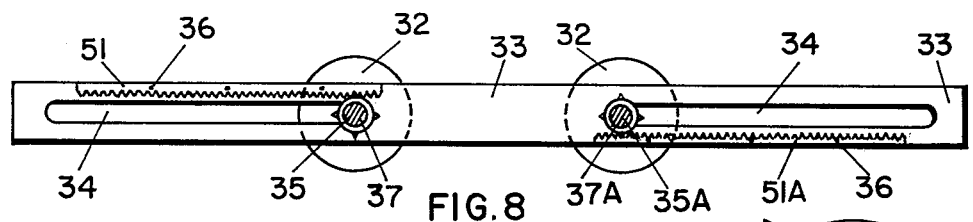
FIG. 8 is a sectional view of the carrier in FIG. 9 taken on line 4'4, and showing the racks and pinions which transfer the power to the wheels.
Figure 10:
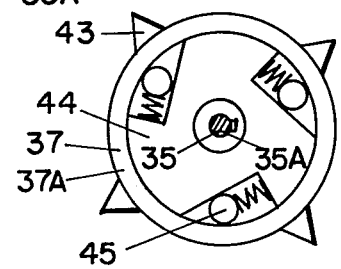
FIG. 10 is a fragmentary view of the ratchet type pinion which traverses the rack.
Figure 9:
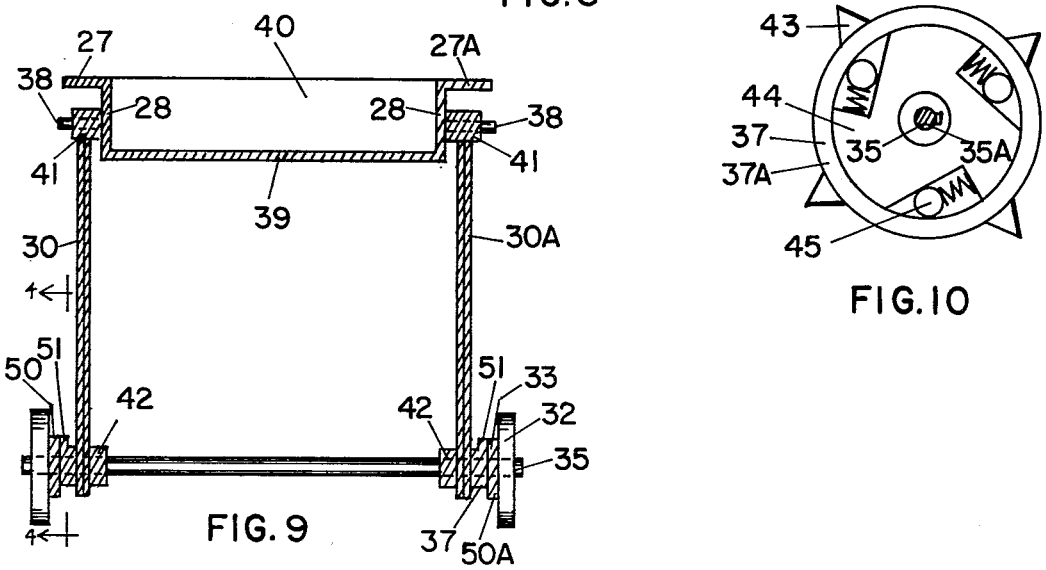
FIG. 9 is a cross-sectional view of the carrier in FIG. 6, taken on line 3—3.

As shown in the drawings, the weight carrier 10 is propelled by the shifting of weight. The user loads weight in the load holding container member 25 and moves it up and down to effect forward movement. Particularly, the invention uses the applied force of material weight or human body weight, therein to effect the principle of reaction wherein the movement of the said weight up and down thereby in sequence so produces forward movement directionally forward relative to the oscillations of the said weight in the container member 25.

Weight is loaded in weight container member 25 in the upright position 47, when the wheels 14 are in the inward position (shown in FIG. 1), and imparting a torque to the said wheels 14 by the applied force of weight and utilizing the advantage of gravity.

Weight container member 25 is suitably formed with four sides and adapted to carry the selected weight load for the purposes desired.

Interconnected and disposed longitudinally directly under the weight container member 25 on two sides, is arranged slotted upper frame members 15, in which one of the same is suitably secured to each of the said underside lengthwise sides of the said weight container member 25 by welding bolts or other securing means. Upper slots 13 and 13A, in the two upper frame members 15, having two of the same (slots) on each side serves to allow upper spindles 17, having one of the same (spindles) for each one of the four journaled bosses 48 in the top ends of the arms 22 and 22A to suitably rotate in unison while being rotatably secured in the said journaled bosses 48 and rotatably secured in guided spaced relationship in the said slots 13 and 13A as the arms 22 and 22A transmit the weight force downward and wherein the weight is positioned on a slanted angle on the arms 22 and 22a, which are aligned and secured to the rotatably secured axles 11 and 11A.

Pinions 20 and 20A, having one of the same for each of the four racks 19 and 19A have an internal clutch 21 which is suitably arranged and secured internally of each of the said four pinions 20 and 20A and are fixedly secured to the axles 11 and 11A by internal keyways not shown and secured and aligned with, and in mesh with, the said racks 19 and 19A which are fixedly secured to the inside of the two lengthwise sides of the slotted lower frame 16. Racks 19 and 19A are secured to the said sides of the lower frame 16 by bolt means 23. Said racks 19 and 19A are fixedly secured to the said lengthwise sides of the slotted lower frame 16 in the inverse positions as shown in FIG. 3, so that as the weight force is applied on the arms 22 and 22A, which are also secured to the rotatable axles 11 and 11A, and which pivot at pivot pins 12 and 12A, cause the clutched pinions 20 and 20A, secured to the axles 11 and 11A, to rotate in the same direction as the said arms 22 and 22A are forced downward by the weight, the lower ends of the said arms 22 and 22A, which are suitably journaled in order that the axles 11 and 11A turn freely and permit the said axles and the said pinions to properly transmit rotation to the wheels 14, as the axles rotate to the outward ends of the slots 18 and 18A in conjunction with each designated rotating clutched pinion in which the teeth 26 of the said pinions 20 and 20A mesh with, engage and follow the said inverse racks 19 and 19A, so that the wheels 14 are forced to rotate in one direction. Each said wheel 14 is suitably spaced from the lengthwise lower frame members 16 by spacer means 46.

When the weight carrier 10 has fully collapsed as shown by numeral 24 (in FIG. 2) the wheels 14 then roll freely, and as the weight carrier comes to a stop, or is stopped, the weight container member 25 must be lifted back up to the upright position 47 as shown in FIG. 1. The weight container member 25 may be lifted by hand to the upright position 47, or other means can be used. Preferably, for heavy loads, a spring means may be secured between the said weight container member 25 and the lower frame member 16, permitting a more responsive means to properly raise and reraise the weight container member 25 to the upright position 47 to restart the oscillation cycle and to perform useful work. May it be seen that when the weight carrier 10 is modified and used as a roller skate with one of the same on each foot, the stated springs may or may not be used.

Embodiment 29 is a modified form of the invention showing the weight container member 49 suitably formed with four sides. Numeral 40 shows the end plates which are formed with the bottom 39 in which the said bottom is formed with the lengthwise sides 28 and 28A thereby forming the said weight container member 49. Wherein the weight is loaded in the said weight container member 49, and as the weight force forces the weight container member 49 downward, slanted arms 30 and 30A which are so arranged on a suitable slant and pivotably secured to the said weight container member 49, are forced downward by the weight, the lower ends of the said arms 30 and 30A which are suitably journaled to provide a suitable bore for each rotating axle 35 and 35A cause the said axles to rotate outward from the near center position to the outward ends in slots 34 and 34A in the lower frame 33. Lower frame 33 has four suitably positioned slots, two of the same on each lengthwise side 50 and 50A. As the weight force on the arms 30 and 30A, two of the same on each side, force the axles 35 and 35A to rotate outward, the pinions 37 and 37A, two of the same on each side, each having an internal oneway clutch 44 and showing clutch bearings 45, are also secured on the axles 35 and 35A in which the forced rotation of the said axles effect the rotation of the said pinions also. Pinions 37 and 37A, having teeth 43, are then uniformly forced to rotate in mesh with the suitably positioned inverse racks 51 and 51A, two on each side, which are secured to the inside of the lengthwise sides 50 and 50A by bolt means 36 of the slotted lower frame 33, thereby effecting the rotation of the wheels 32 which rotate in one direction. Arm stops 31, two of the same on each side, are secured, spaced and arranged so that the weight container member 49 does not move out of normal alignment with the arms 30 and 30A.

Arms 30 and 30A, which pivot in raised bosses 41 and 41A, are pivotally secured to the weight container member 49 on the lengthwise sides by spindles 38 and 38A with two of the same on each side for the four pivoting arms 30 and 30A. Keeper ring means 42, suitably secured on the axles 35 and 35A, with one of the same for each of the said four arms 30 and 30A, position and hold the same arms in place on each side of the two axles for effective alignment in order that the said arms 30 and 30A do not slide inward.

As the weight container member 49 moves from the upright position designated by numeral 52, to the collapsed position designated by numeral 53, flanges 27 and 27A, one of the same on each lengthwise side of the said weight container member 49, interlock on the lower frame 33 in the collapsed position in which the wheels then roll freely. And again, as the weight carrier comes to a stop, or is stopped, the weight container member 49 must be raised back up to the upright position 52 as shown in FIG. 6. Suitable means to lift the weight container member 49 to the upright position relative to the loan weight selected is not shown. But, for light loads, if necessary the weight container member 49 may be raised again to the upright position by hand. For heavier loads, a spring means may be secured between the said weight container member 49 and the lower frame member 33, to permit an easy means to raise and reraise the said weight container member 49 back to the upright position 52, and restart the oscillation cycle. A selected handle means or lever action handle may be also more preferred, but is not shown.

Each arm and wheel asssembly is of such a construction that when weight pressure is exerted on the weight carrier container members 25 and 49 as set forth and in conjunction with the functioning parts employed, provides suitable spaced supporting means for the weight load relative to the applicable use. For loading or unloading ships, airplanes, boxcars or other associated use, the weight carrier's shape, length and dimension is subject to variation and is constructed to meet the load requirements.

May it be realized that when used as a roller skate with one of the same on each foot, the weight carriers are modified in size and shape and also modified to secure each foot with toe straps and heel wells for the user. The straps and heel wells are not shown.

Mechanical controls for steering, braking and related more preferred dynamics is not shown.

Particularly, the weight carrier may be modified appropriately so that castor wheels, not shown, may be used on one selected end for steering in lieu of that shown.

Preferrably the weight carrier is made of light metal, such as aluminum or glass fiber reinforced plastic material, or other suitable various plastic or metal material following the techniques used in the art, or other more preferred materials. The variety of materials that may be used therein are well known in the art and require no separate description herein.

It will be recognized that the embodiments herein are only illustrative and that various modifications and changes therein may be made without departing from the underlying and essential features hereinafter claimed.

I claim:

1. In a weight carrier propelled by the oscillation of weight consisting of a lower frame member and an upper frame member; and slots in the upper frame member for guides and slots in the lower frame member for axles; two pair of pivotable arms extending from the guides in the upper frame member to the axles in the lower frame member; clutched pinions mounted on the lower axles; and racks fixedly mounted on the said lower frame member; wherein said clutched pinions engage the said racks when weight forces the upper load frame member downward and forces the axles to turn.

2. In a weight carrier propelled by the oscillations of weight; including a lower carriage frame member having ground engaging wheels thereon; and slots in the lower said frame member with axles going through the slots for the wheels an upper load frame member, means interconnecting the upper and lower frame members for movement of the upper frame member relative to the lower frame member and a pivotably secured arm member extending from the upper load frame member to one of the said axles in the slotted lower frame member; and a clutched pinion mounted on the axle to engage a rack member secured to the lower frame member; and a spring means mounted within the upper and lower frame members acting on the pivotably secured arm member to return the upper load frame member to the upper extended position when the weight is lifted.

* * * * *